(12) United States Patent
Sommerfelt et al.

(10) Patent No.: US 9,387,543 B2
(45) Date of Patent: Jul. 12, 2016

(54) UNIBIT RE-SHARPENING DEVICE

(71) Applicants: Richard Sommerfelt, Vacaville, CA (US); Maureen Sommerfelt, Vacaville, CA (US)

(72) Inventors: Richard Sommerfelt, Vacaville, CA (US); Maureen Sommerfelt, Vacaville, CA (US)

( * ) Notice: Subject to any disclaimer, the term of this patent is extended or adjusted under 35 U.S.C. 154(b) by 69 days.

(21) Appl. No.: 14/562,643

(22) Filed: Dec. 5, 2014

(65) Prior Publication Data

US 2016/0158859 A1 Jun. 9, 2016

(51) Int. Cl.
*B24B 3/24* (2006.01)
*B23D 67/10* (2006.01)

(52) U.S. Cl.
CPC ............... *B23D 67/10* (2013.01); *B24B 3/242* (2013.01)

(58) Field of Classification Search
CPC .......... B24B 3/242; B24B 3/24; B24B 19/04; B24B 19/022; B24B 19/02; B24B 3/18; B24B 3/26
USPC ............................. 451/344, 356, 164, 165, 48
See application file for complete search history.

(56) References Cited

U.S. PATENT DOCUMENTS

| | | | |
|---|---|---|---|
| 2,345,100 A | 3/1944 | Cotton | |
| 2,578,081 A * | 12/1951 | Miller | B24B 3/605 451/164 |
| 2,821,820 A | 2/1958 | Thurman | |
| 2,833,092 A * | 5/1958 | Hamai | B24B 3/24 451/375 |
| 3,341,981 A | 9/1967 | Baronyak | |
| 3,382,738 A | 5/1968 | Copeland | |
| 3,393,476 A | 7/1968 | York | |
| 3,576,089 A * | 4/1971 | Magnuson | B24B 7/02 451/165 |
| 3,698,140 A | 10/1972 | Steadman | |
| 3,930,342 A * | 1/1976 | Moores, Jr. | B24B 3/26 451/216 |
| 4,974,372 A | 12/1990 | Chantalat | |
| 6,254,464 B1 * | 7/2001 | Kawata | B24B 3/60 451/162 |
| 7,186,169 B2 * | 3/2007 | Kawata | B24D 15/06 451/164 |
| 2004/0076483 A1 * | 4/2004 | Singh | B23B 51/009 408/1 R |
| 2007/0264094 A1 | 11/2007 | Seeley | |
| 2008/0029311 A1 | 2/2008 | Seeley | |

* cited by examiner

*Primary Examiner* — Robert Rose
(74) *Attorney, Agent, or Firm* — The Keys Law Firm PLLC

(57) ABSTRACT

A unibit re-sharpening device for reconditioning the surface of worn unibits by filing them in a tapered recess. The unibit re-sharpening device comprises a device housing having a tapered recess with a diamond infused file therein, with the file connected to an integrated electric motor and high frequency mechanical vibrator, with an attachable collet for securing a conventional unibit in the tapered recess. In use, a unibit is secured in the collet and the collet is placed in the tapered recess. The power switch is then turned on, causing the motor and vibrator to vibrate the file and resulting in material being cut from the cutting edge or face of the unibit by the vibrating file. While the file is vibrating, a user can rotate the unibit to expose its whole conical surface to the file, thereby sharpening the entire unibit.

5 Claims, 1 Drawing Sheet

UNIBIT RE-SHARPENING DEVICE

BACKGROUND OF THE INVENTION

1. Field of the Invention

This invention relates generally to tool accessories and, more particularly, to an apparatus which enables a unibit which has dulled to be re-sharpened.

2. Description of the Prior Art

The use and design on step drill bits (or unibits) as drill bits having a conical shaped with a stairstep profile is well established. It is common for unibits to be used on sheet metal and in general construction. A problem which still exists, however, is that unibits, unlike common drill bits, cannot typically be re-sharpened when worn. Consequently, users of unibits are generally subjected to a repeated, ongoing expense to replace worn bits. Thus, there remains a need for a unibit re-sharpening device which would enable unibits to be re-sharpened after they have been dulled from use. It would be helpful if such a unibit re-sharpening device included a tapered recess to enable unibits of various sizes to be resharpened therein. It would be additionally desirable for such a unibit re-sharpening device to utilize a diamond infused file to contact the cutting edge or face, providing maximum cutting ability for a re-sharpening surface.

The Applicant's invention described herein provides for a unibit re-sharpening device adapted to uniformly cut fine amounts from a dulled unibit mechanically. The primary components in Applicant's unibit re-sharpening device housing are a tapered recess, a diamond infused file, a collet and a power source. When in operation, the unibit re-sharpening device enables the re-sharpening of worn unibits by end users, thereby delaying the necessity to discard and replace such unibits. As a result, many of the limitations imposed by prior art structures are removed.

SUMMARY OF THE INVENTION

A unibit re-sharpening device for reconditioning the surface of worn unibits by filing them in a tapered recess. The unibit re-sharpening device comprises a device housing having a tapered recess with a diamond infused file therein, with the file connected to an integrated electric motor and high frequency mechanical vibrator, with an attachable collet for securing a conventional unibit in the tapered recess. In use, a unibit is secured in the collet and the collet is placed in the tapered recess. The power switch is then turned on, causing the motor and vibrator to vibrate the file and resulting in material being cut from the surface of the unibit by the vibrating file. While the file is vibrating, a user can rotate the unibit to expose its whole conical surface to the file, thereby sharpening the entire unibit.

It is an object of this invention to provide a unibit re-sharpening device which would enable unibits to be re-sharpened after they have been dulled from use.

It is another object of this invention to provide a unibit re-sharpening device that included a tapered recess to enable unibits of various sizes to be resharpened therein.

It is yet another object of this invention to provide such a unibit re-sharpening device that utilizes a diamond infused file to contact the cutting edge or face, providing maximum cutting ability for a re-sharpening surface.

These and other objects will be apparent to one of skill in the art.

DETAILED DESCRIPTION OF THE INVENTION

Figure 1:
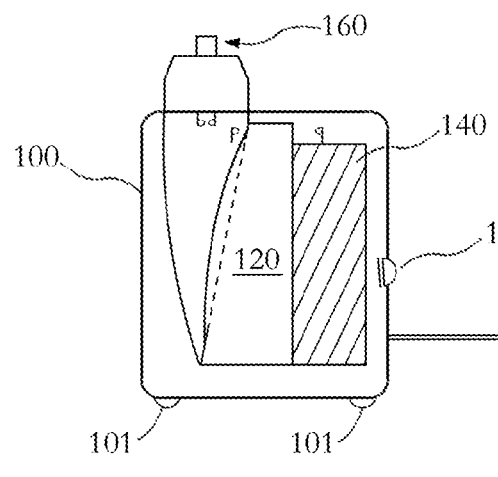
FIG. 1 is a side cross-sectional view of a unibit re-sharpening device built in accordance with the present invention having its plunger collet disposed therein.
Figure 2:
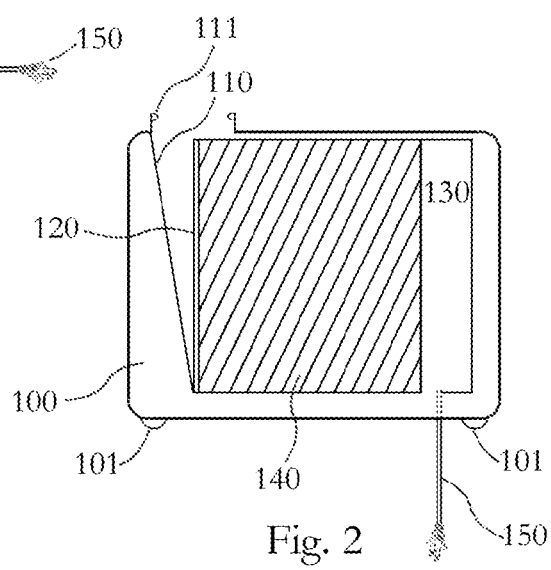
FIG. 2 is a front cross-sectional view of a unibit re-sharpening device built in accordance with the present invention.
Figure 3:
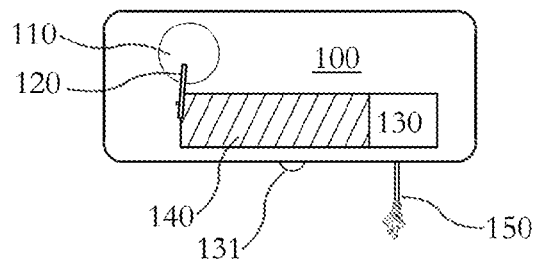
FIG. 3 is a top cross-sectional view of a unibit re-sharpening device built in accordance with the present invention.
Figure 4:
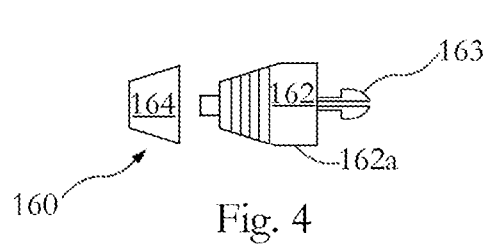
FIG. 4 is a side elevational view of the plunger collet of a unibit re-sharpening device built in accordance with the present invention without a unibit secured therein.
Figure 5:
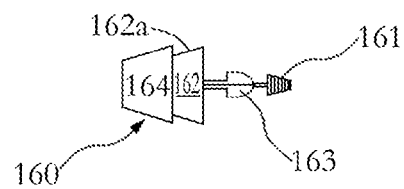
FIG. 5 is a side elevational view of the plunger collet of a unibit re-sharpening device built in accordance with the present invention with a unibit secured therein.

Referring now to the drawings and in particular FIGS. 1-5, a unibit re-sharpening device is shown as a device housing 100 having a tapered recess 110, a diamond infused file 120, an electric motor 130, a high frequency mechanical vibrator 140, an electrical plug 150 and an attachable collet 160. The device housing 100 provides a container body in which the components of the unibit re-sharpening device are disposed and includes a four vibration absorbing cushion feet 101 that allow vibrations produced by the vibrator 140 to be substantially absorbed. The housing 100 includes an aperture in its top surface, revealing the tapered recess 110 that extends from the top surface of the housing 100 into the body of the housing 100. The tapered recess 110, which provides a location in which a unibit to be sharpened can be placed and contacted by the diamond infused file 120, includes a securing lip 111 extending from in its interior surface that that enables it to receive and hold in a fixed vertical position the attachable collet 160 while still enabling the collet 160 to be manually rotated.

The diamond infused file 120 defines a metallic file that has been reinforced with diamond material to improve its durability. The file 120 is tapered at one end and a fixedly attached to the vibrator 140 at the other end. The tapered end of the file 120 extends into the tapered recess 110, providing a surface that can cut fine amounts from a unibit disposed in the tapered recess 110 to re-sharpen the surface of such a unibit.

The vibrator 140 is integrated with an electric motor 130, enabling it to generate high frequency vibrations when electricity is supplied thereto. The electric motor 130 is connected to an electrical plug 150 for availing electricity, with a power switch 131 included to enable the selective provision of available electricity from the plug 150 to the motor 130. In this regard, the power switch 131 provides a mechanically actuated switch that enables the motor 130 to be turned on, causing the vibrator 140 to vibrate the file 120, and off.

The collet 160 is sized to receive the stem of a conventional unibit 161 and securely hold it in place when tightened. The collet 160 includes a holding member 162 with external threads and a clamping structure 163, a tightening member 164 with internal threads corresponding to the external threads of the holding member 162. The holding member additionally includes a fastening ring 162a encircling its exterior surface that is sized to receive the securing lip 111 of the tapered recess 110 to enable the collet 160 to be held in a fixed vertical position in place over the tapered recess 110 while allowing it to be rotated by manual action.

The collet 160 functions in a similar manner to typical collet chucks, with a unibit 161 being secured in the collet 160 by placing it in the clamping structure 163 and screwing the tightening member 164 onto the holding member 162, causing the clamping structure 163 to tighten around the unibit 161. The collet 160 can then be placed in the tapered recess 110 with the securing lip 111 engaging the fastening ring 162a and any unibit 161 held therein will be held in the tapered recess 110, exposed to the surface of the file 120.

In operation, a unibit 161 is secured in the collet 160 and the collet 160 is placed in the tapered recess 110. The power switch 131 is then turned on, causing the motor 130 and vibrator 140 to vibrate the file 120. This results in material being cut from the surface of the unibit 161 by the vibrating file 120. While the file 120 is vibrating, a user can rotate the unibit 161 to expose its cutting edge or face to the file 120, thereby sharpening the entire unibit 161.

It is contemplated that the unibit re-sharpening device can be employed to sharpen bits of many types, including conventional step drill bits, unibits, single flute cutting edge tapered drill bits, rotary hole punches, fractional, metric, high speed steel, cobalt, and titanium nitrate coated types.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A unibit re-sharpening device for reconditioning the surface of worn unibits, comprising:
   a device housing having a top surface and an integrated power source, wherein said top surface includes a top surface aperture;
   a tapered recess extending into the device housing from the aperture;
   an attachable collet configured to hold a unibit and be secured over the tapered recess such that a unibit being held extends into the tapered recess;
   an integrated motor and vibrator disposed in the device housing and connected to said power source; and
   a tapered file connected to said integrated motor and vibrator such that it vibrates when the integrated motor and vibrator disposed are supplied electricity from the power source, wherein said tapered file is disposed in the device housing such that it extends into the tapered recess such that it contacts the surface of a unibit held in the tapered recess by the collet.

2. The unibit re-sharpening device of claim 1, wherein the device housing includes a plurality of vibration absorbing cushion feet.

3. The unibit re-sharpening device of claim 1, wherein the tapered recess and the collet are configured such that the tapered recess can receive and hold in a fixed vertical position the collet while still enabling the collet to be manually rotated and the cutting edge or face thereof to be contacted.

4. The unibit re-sharpening device of claim 3, wherein the tapered recess includes a securing lip extending from in its interior surface that that enables it to receive and hold in a fixed vertical position the collet while still enabling the collet to be manually rotated.

5. The unibit re-sharpening device of claim 4, wherein the collet includes fastening ring encircling its exterior surface that is sized to receive the securing lip of the tapered recess.

* * * * *